(12) United States Patent
Kuechenthal et al.

(10) Patent No.: US 12,118,420 B2
(45) Date of Patent: Oct. 15, 2024

(54) SMART CONSUMABLES/IDENTIFIER LABEL AND ANTENNA FOR SMART CONSUMABLES/IDENTIFIER LABEL

(71) Applicant: Merck Patent GmbH, Darmstadt (DE)

(72) Inventors: Christian-Hubertus Kuechenthal, Darmstadt (DE); Roja Azees, Darmstadt (DE); Dan Kvelstad, Darmstadt (DE); Sven Erfurth, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 58 days.

(21) Appl. No.: 17/777,645

(22) PCT Filed: Nov. 18, 2020

(86) PCT No.: PCT/EP2020/082483
§ 371 (c)(1),
(2) Date: May 18, 2022

(87) PCT Pub. No.: WO2021/099355
PCT Pub. Date: May 27, 2021

(65) Prior Publication Data
US 2023/0004773 A1    Jan. 5, 2023

(30) Foreign Application Priority Data

Nov. 21, 2019 (EP) .................................. 19210659
Feb. 28, 2020 (DE) .................... 102020105417.3

(51) Int. Cl.
*G06K 19/077* (2006.01)
*H01Q 1/22* (2006.01)

(52) U.S. Cl.
CPC ... *G06K 19/07726* (2013.01); *G06K 19/0776* (2013.01); *G06K 19/07767* (2013.01); *H01Q 1/2225* (2013.01)

(58) Field of Classification Search
None
See application file for complete search history.

(56) References Cited

U.S. PATENT DOCUMENTS 9,886,661 B1 *   2/2018  Tercsinecz ....... G06K 19/07722
2007/0063057 A1  3/2007  Masubuchi et al.
(Continued)

FOREIGN PATENT DOCUMENTS

CN      101752648 B        2/2013
CN      105373826 A   *    3/2016
(Continued)

OTHER PUBLICATIONS

Machine translation of CN 105373826A, retrieved from the EPO on Mar. 6, 2024 (Year: 2024).*
(Continued)

*Primary Examiner* — Suezu Ellis
(74) *Attorney, Agent, or Firm* — MILLEN, WHITE, ZELANO & BRANIGAN, P.C.; Brion P. Heaney

(57) ABSTRACT

Described herein is a label 1 for marking containers or equipment by adhering the label to a surface thereof. The label 1 includes a support material base 11, at least one RFID microelectronic device 5c included in the support material base 11, and a plurality of antennas 5a,5b for different frequency ranges connected with the at least one RFID microelectronic device 5c and included in the support material base 11. The plurality of antennas 5a, 5b include a first antenna 5a for the frequency range of 860 to 960 MHz and having a theoretical read range peak of more than 4 m when provided on a glass surface, and the label has a dimension of 40 mm*20 mm or less.

18 Claims, 8 Drawing Sheets

(56) References Cited

U.S. PATENT DOCUMENTS

| | | | | |
|---|---|---|---|---|
| 2008/0143480 A1* | 6/2008 | Egbert | ................ | H04B 5/0062 |
| | | | | 340/10.1 |
| 2018/0277957 A1 | 9/2018 | Geist et al. | | |
| 2020/0202192 A1* | 6/2020 | Hu | ................ | G06K 19/06028 |

FOREIGN PATENT DOCUMENTS

| | | | |
|---|---|---|---|
| CN | 208851470 U | | 5/2019 |
| JP | 2004054337 A | * | 2/2004 |

OTHER PUBLICATIONS

Machine translation of JP 2004054337A, retrieved from the FIT database on Mar. 7, 2024 (Year: 2024).*

International Search Report dated Feb. 11, 2021 issued in corresponding PCT/EP2020/082483 application (3 pages).

* cited by examiner

SMART CONSUMABLES/IDENTIFIER LABEL AND ANTENNA FOR SMART CONSUMABLES/IDENTIFIER LABEL

The invention concerns a smart consumables/identifier label and an antenna for such a smart consumables/identifier label. In particular, the application concerns a RFID label for marking containers or equipment, preferably in a laboratory environment and including in particular cylindrical bottles, vials, syringes, etc., by adhering the RFID layer to a surface thereof.

The label combines both, an UHF (Ultra High Frequency) antenna for long-range applications and NFC Near Field Communication) antenna for short-range applications on a single chip. Both antennas share a memory and other electronic processing elements at need. Combining UHF and NFC, the inlay is well-suited for product authentication and brand protection, supply chain management, and warehouse inventory. Especially, in the medial and pharmaceutical area, sue to the reduced size of the bottles, vials, syringes a label with small dimensions is required.

Basically, such a label, having a size of 29 mm*13 mm is known from http://www.lab-id.com/wordpress/wp-content/uploads/2017/08/B34.pdf.

In general, smart consumables/identifier labels or RFID labels are available on the market. Different types of labels are needed for use in various areas. In addition, the frequency ranges for the communication with external devices differ according to the geographic area or intended application to read the RFID labels. It might happen, for example, that it will not be possible to use a RFID Label in Europe and the US. Using dual frequency ranges for NFC (and UHF) in a label is highly limited.

In addition, tamper detection, flexibility to use on any surfaces of different containers encountered in the laboratory field, in particular such containers of different size/volume that have cylindrical outer surfaces like bottles, vials, syringes, etc., with different curvature, or chemical resistance combined into one RFID labels are not available in the market.

In practical use these labels are required to be small and to have large read ranges, if possible for both NFC and UHF. Unfortunately, it has shown that in practical use, that is when the label is firmly attached to a container, like a glass or plastic bottle, due to the electromagnetic coupling the read range of the known labels is not always satisfactory.

Other known labels, which might show better read ranges however due not satisfy the size restriction for small, bottles, vials, syringes mentioned above.

It is thus an object of the invention to provide a RFID label comprising an antenna which allows a larger read range while maintaining the label small and implementing both types of communication, i.e. NFC and UHF.

The smart consumables/identifier label in particular is to meet one or more of the following requirements:
global usability;
extended reading range on glass and plastic with limited dimensions;
high temperature range of use;
sufficient flexibility to stick on different containers with varying sizes;
chemical resistance against common solvents and cleaning substances in the laboratory environment (e.g. acetone, acetonitrile, ethanol, isopropanol);
tamper detection, preferably for one time usability.

To meet one or more of these requirements the invention provides a smart consumables/identifier label and a corresponding UHF antenna with the features of claim 1 or 9. Preferred embodiments are defined in the dependent claims.

The invention in particular provides, in a first solution, a smart consumables/identifier label for marking containers, preferably bottles, vials, syringes, etc., or equipment by adhering the RFID label to a surface thereof, the label comprising a support material base, at least one RFID microelectronic device included in the support material base, and a plurality of antennas connected with the at least one RFID microelectronic device and included in the flat support material base, wherein the plurality of antennas include a first antenna for the frequency range of 860 to 960 MHz and having a theoretical read range peak of more than 4 m when provided on a glass surface, wherein the label has a dimension of 40 mm*20 mm or less.

The invention in particular provides, in a second solution, an antenna for an RFID label having a dimension of 40 mm*20 mm or less for marking containers or equipment by adhering the RFID label to a surface thereof, the antenna having a theoretical read range peak of more than 4 m in a range between 860 MHz to 960 MHz, when provided on a glass surface.

Preferably, the above antenna comprises a first, second and third portion, the first portion provided adjacent to one of the shorter sides of the RFID label and including a line antenna arranged in a serpentine form with five rectangular or sine shaped half waves and a plate like end element, the second portion provided adjacent to the opposite shorter side of the RFID label on the same surface and including a line antenna arranged in a serpentine form with one or two rectangular or sine shaped half waves and a larger plate like end element, and the third portion provided adjacent to a longer side of the RFID label on the same surface and connecting the first and second portion.

Preferably the first and second portion of the antenna are spaced apart from each other so as to nest a second antenna there between, the second antenna being configured for NFC communication in a range of 13 MHz.

Preferably, the first and second portions of the antenna have a width of the line antenna part of 0.5 mm±0.2 mm.

Preferably, the first and second portions of the antenna have rectangular half waves with a width of the line antenna part of 0.5 mm±0.2 mm and a clear space between the two sides of the rectangle of 0.5 mm±0.2 mm.

Preferably, the distance between the respective outer parts of the first and second portions in the direction of the longer side of the RFID label is 36.0 mm±0.2 mm.

Preferably, the distance between respective inner parts of the first and second portions in the direction of the longer side of the RFID label is 24.8 mm±0.2.

Preferably, each half wave of the first and second portion includes a first segment extending along the longer direction of the RFID label and having a length of 5.6 mm±0.2, a second segment extending along the shorter direction and having a length of 1.5 mm±0.2 and a third segment extending along the longer direction of the RFID label and having a length of 5.6 mm±0.2.

The invention in additionally provides a Container, including in particular cylindrical bottles, vials, syringes, etc, with a RFID label (1) according to any one of claims 1 to 8 and an antenna for the RFID label (1) according to any of the claims 9 to 16 on a surface thereof.

The invention will now be described by reference to the attached drawing showing two different embodiments as an example.

Figure 1:
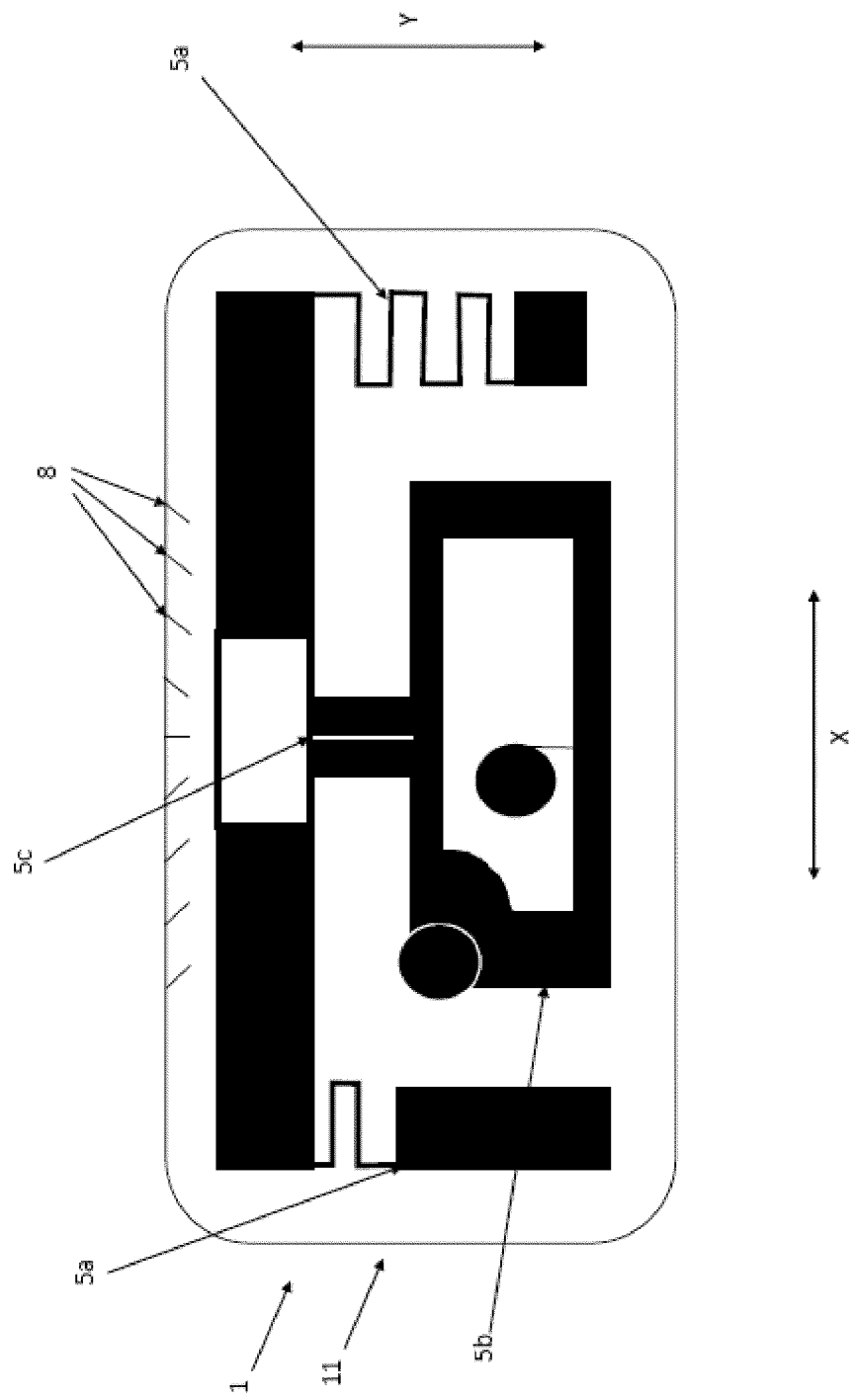
FIG. 1 shows a top view of a RFID label according to a first embodiment.
Figure 2:
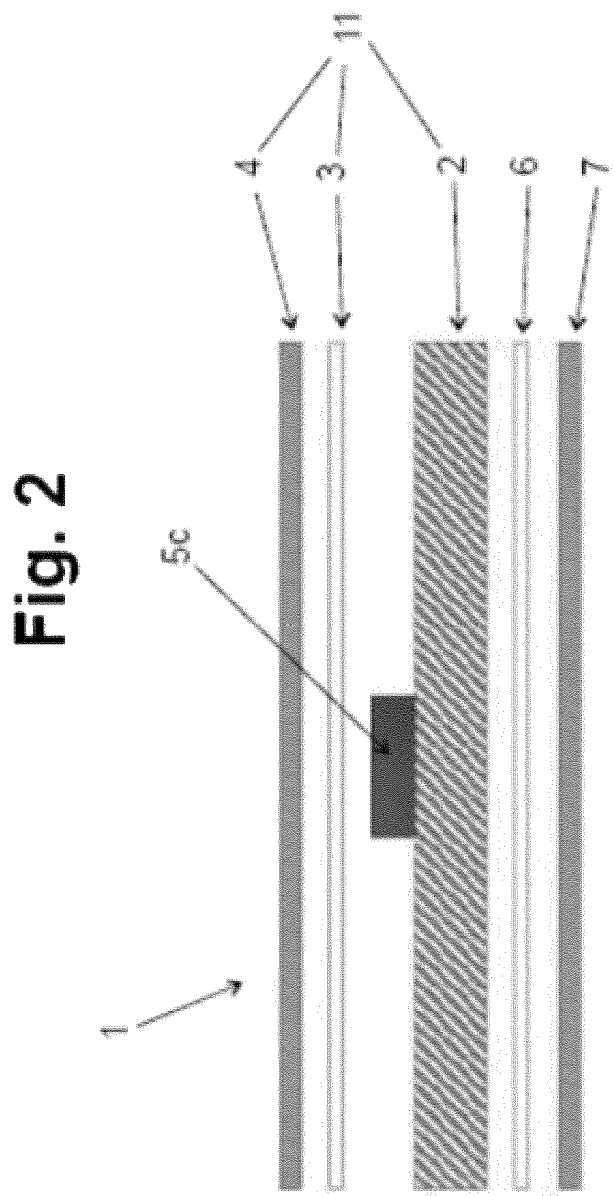
FIG. 2 shows a schematic cross section of the RFID label of FIG. 1.
Figure 3:
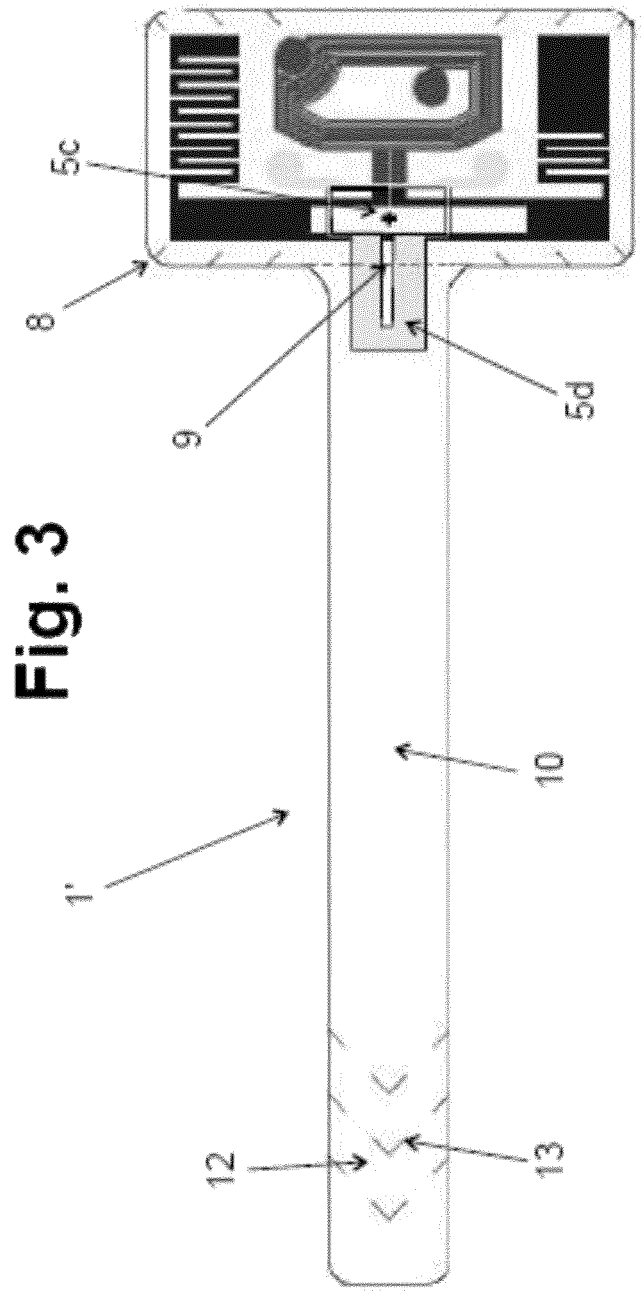
FIG. 3 shows a top view of a RFID label according to a second embodiment.

The RFID label 1, 1' of the invention as shown in FIGS. 1 to 3 generally includes a flat flexible support material base 11, at least one RFID microelectronic device 5c included in the flat support material base, and at least one antenna 5a, 5b connected with the at least one RFID microelectronic device 5c and included in the flat support material base 11.

The flat support material base 11 is substantially rectangular in a top view and is formed from a plastic or paper-based material on a surface of which the functional circuitry including the antenna and, preferably, a conductive loop 5d for tamper protection described later is/are printed or is formed from a metal layer 2, preferably an aluminium sheet which is cut or etched to form the functional circuitry and is laminated with or completely sealed within a protective layer (not shown).

The RFID chip (for example the chip EM4423T IC from EM MICROELECTRONIC-MARIN SA) is preferably an integrated circuit component 5c including the necessary RFID functionality and it is arranged on the surface of the metal layer 2 or printed plastic or paper-based material and has the respective terminals connected with the external circuitry (antenna(s), conductive loop).

The flat support material base 11 further has a PP (polypropylene) synthetic top surface layer 4 laminated on the printed plastic or paper-based material or the metal layer 2. The PP synthetic top surface layer 4 provides a temporary chemical resistance for different chemicals and acids (e.g. acetone, acetonitrile, isopropanol, methanol and 30% hydrochloric acid) typically encountered in the laboratory environment and it protects the RFID microelectronic device 5c and the external circuitry 5a, 5b, 5d. The PP synthetic top surface layer 4 may be adhered to the plastic or paper-based material or the metal layer 2 by an acrylic adhesive layer 3. A similar PP synthetic bottom surface layer (not shown) may be provided as needed Preferably the flat support material base 11 has, on its bottom surface, an adhesive bottom layer 6 or an adhesive applied to the bottom surface. The adhesive bottom layer 6 may be made from an acrylic adhesive and is covered by a release liner 7 that is to be removed (peeled off) prior to the application of the label to the desired surface.

The RFID microelectronic device 5c included in the support material base 11 (for example the above-mentioned chip EM4423T IC) is configured to communicate with external devices via two different frequency ranges, i.e. UHF and NFC, and thus has two different antennas 5a, 5b connected with the RFID microelectronic device and included in the flat support material base 11, too. The frequency of the NFC Band is 13.55-13.58 MHz. The frequency ranges in the UHF spectrum may be chosen to suit the respective geographical regions in which the label is to be used.

Figure 4:
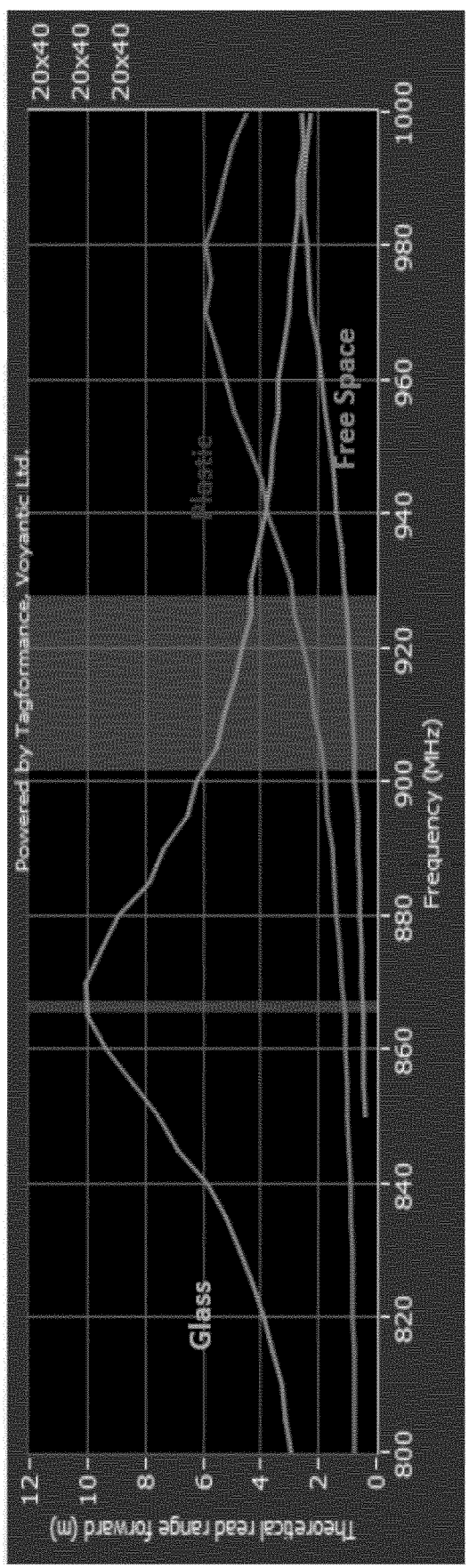
FIG. 4 shows the performance or reach for different UHF frequencies when the label according to the first embodiment is placed on different materials.
Figure 5:
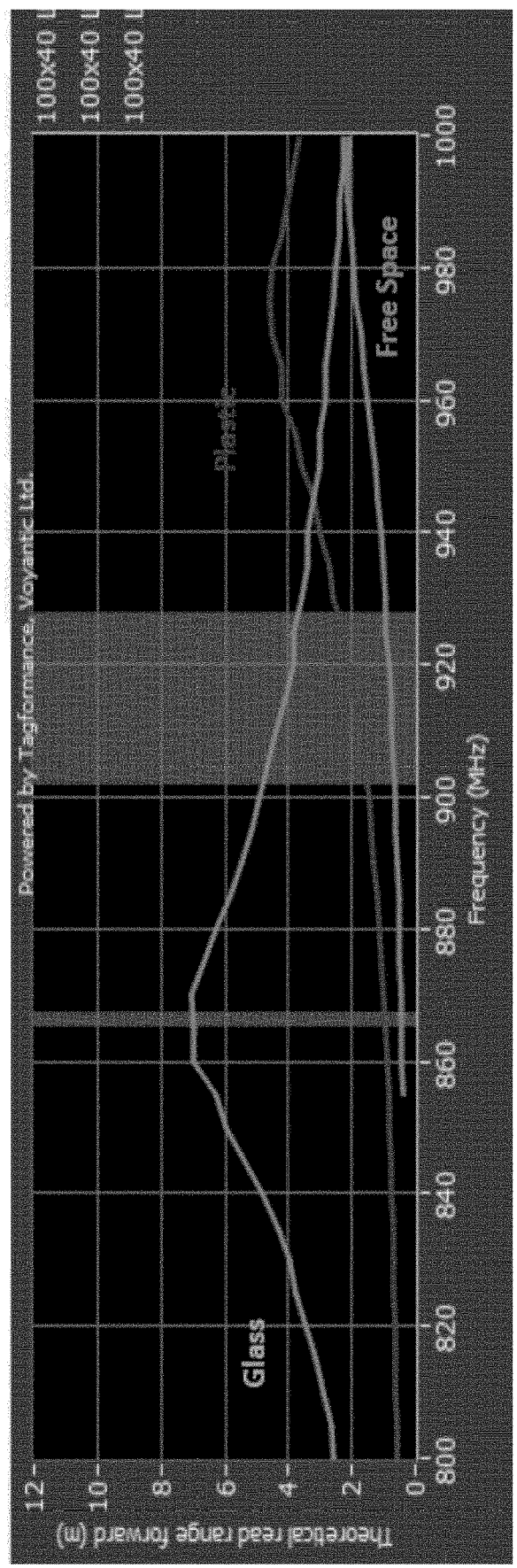
FIG. 5 shows the performance or reach for different UHF frequencies when the label according to the second embodiment is placed on different materials.
Figure 6:
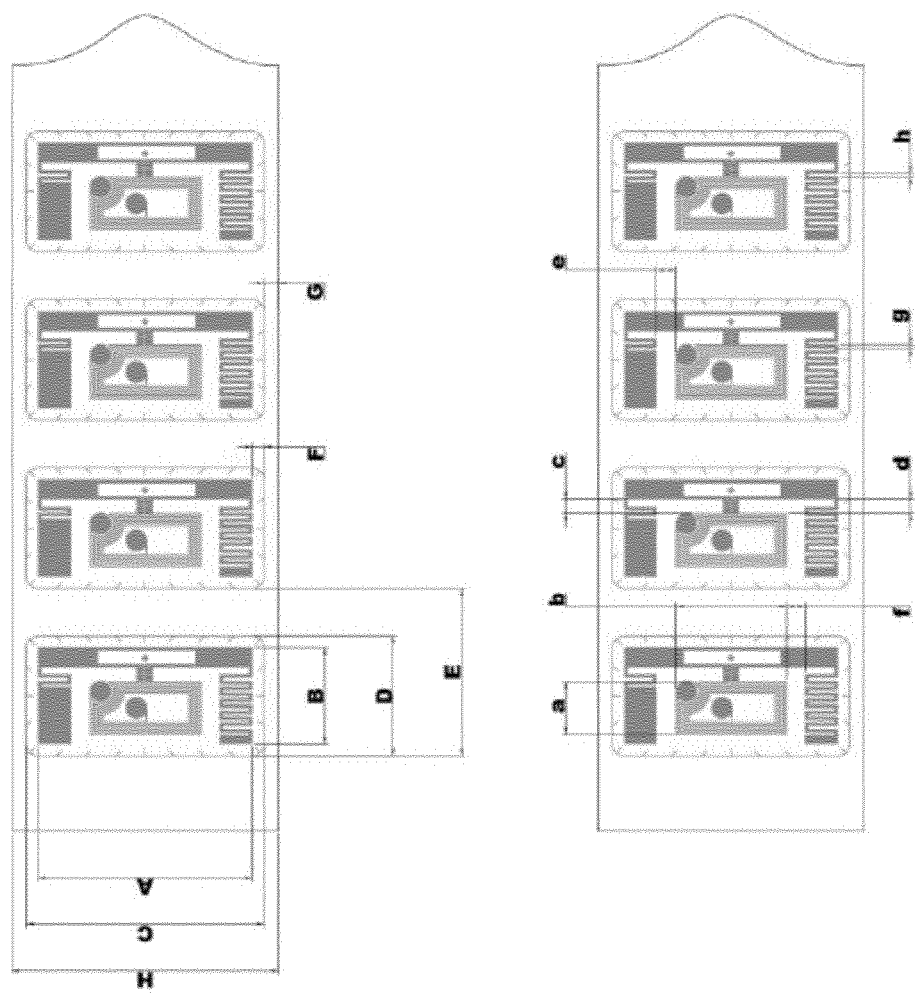
FIG. 6 shows a plurality of labels as explained in connection with FIG. 4 provided on a carrier web and showing the actual dimension in detail.

FIGS. 4 and 5 show the performance or reach for different UHF frequencies when the label according to the first embodiment or second embodiment is respectively placed on bottles of different materials. When the label 1, 1' is placed, for example, on a glass bottle, UHF performance or range is 4.8 m in EU band (865-868 Mhz) and 4.7-3.7 m in US band (902-928 MHz).

This theoretical read range (forward) is obtained using a VOYANTICRFID Measurement Cabinet with Tagformance lite, a start frequency of 800 MHz, an stop frequency of 1000 MHz, a TxPower of 27 dBm (4 W EIRP) and an antenna gain of 6 dBi.

As shown in FIGS. 1 and 3 the two antennas 5a, 5b for HF and UHF are arranged on the metal layer 2 or the printed plastic or paper-based material such that the second antenna (i.e. the HF or NFC antenna 5b) is arranged between the first and second portion of the first antenna (i.e. the UHF antenna 5a) in two configurations for different frequency bands. That is the second antenna is nested within the first antenna to reduce the space required for accommodating the antennas and thus limit the required size for the label despite of the expanded communication functionality.

A tamper detection function of the RFID label is realized in different ways. In both embodiments the flat support material base 11 may have a number of predefined cuts 8 distributed about its outer periphery. The cuts 8 are substantially straight cuts or incisions through or substantially through the thickness of the support material base 11, preferably the PP synthetic top surface layer 4 but not through the metal layer 2 or the printed circuitry. The cuts must not necessarily reach through the entire material thickness but can be limited to a weakening to an extent that pulling on the label opens the cut without the possibility to re-arrange the label.

The cuts 8 are oriented so as to be inclined with respect to an outer edge of the flat support material base in a top view. The cuts 8 are preferably oriented substantially towards a central portion of the flat support material base in the top view, not necessarily a single point but a larger area, but they may be oriented radially from one or more point(s), too. Thus, some of the cuts in the center of the longitudinal extension of the edges may have an angle of about 90° to the edge contour whereas the other cuts are inclined with an angle different from 90°.

The cuts serve as security cuts that would easily break or open in case someone tries to pull off the label after the same is adhered to the surface of the respective container or piece of equipment.

The cuts 8 extend over a length between 3% and 10% of the length of the outer edge of the flat support material base 11 at which they are provided or in the direction of which they extend (X- or Y-direction in FIG. 1). Further, the cuts 8 are spaced from each other along the longitudinal direction of the outer edge by a length between 5% and 30% of the length of the outer edge of the flat support material base at which they are provided or in the direction of which they extend. For example, if the flat support material base has a rectangular outline as shown in FIGS. 1 and 3 with typical dimensions of 20 mm×40 mm, the depth of the cuts into the label, i.e. the length in the top view, is preferably 1.5 mm and the spacing along the outer edge contour is 5 mm.

The distribution of the cuts around the periphery not only provides the safety function against tampering or removal but also imparts a certain additional flexibility to the label to accommodate different curvatures along the directions of extension of the surface to which it is to be attached and to improve long-time adherence of the label.

In the preferred embodiment of the label 1' shown in FIG. 3 the flat flexible support material base 11 includes an elongated flexible extension strip 10 integrally formed with the support material base 11 so as to extend from an edge in a certain direction. The strip 10 is configured so that it can be at least partly (or fully) separated from the support material base 11 at a predefined separation structure 9 on application of a certain pulling force. The separation structure 9 is preferably in the form of a predefined tearing line formed by a number of spaced apart and aligned predefined incisions in the material. The strip 10, in particular its width and length, is dimensioned such that it can be routed over a spout or opening or lid/plug of a container while the label is attached to a peripheral surface of the container. The strip may contain, at its distal end portion, an adhesive section 12 that may be additionally provided with a defined tearing portion 13 preventing peeling off of the adhesive section 12 without destruction of the strip in this zone. Plural strips 10 may be provided at different sides of the support material base 11.

The separation structure 9, preferably in the form of the tearing line, is preferably unsymmetrical to define a preferred start of tearing at one side and to eventually stop the tearing at the other side to avoid complete separation of the strip 10.

In the preferred embodiment of the label 1' shown in FIG. 3 the at least one RFID microelectronic device 5c includes a tamper detection function and the label includes an associated conductive loop or pattern 5d printed on the plastic or paper-based material or included in the metal layer 2 and conductively connected with tamper detection function terminals of the RFID microelectronic device 5c so as to be included in the flat support material base 11. If one tries to remove the label from the container, the conductive loop 5d is torn and the interruption can be detected by the RFID microelectronic device 5c and communicated to the outside upon interrogation as an indication of the seal breaking. This function is particularly useful if, as in the embodiment of FIG. 3, the conductive loop 5d extends over the predefined separation structure 9 (tearing line) because its interruption is indicative of a potential opening of the container after removal of the strip 10.

The conductive loop may also be routed through other relevant parts of the label. In addition, a separate conductive loop may be provided in the label to protect, for example, the tampering of the RFID microelectronic device 5c. In addition, the conductive loop can be arranged on the same side surface as the antenna(s) or may be led and arranged to a backside of the antenna layer 2 to have a better protection against external impacts and increased flexibility of arrangement without conflict with the antenna(s) (see FIG. 3). As shown in FIG. 3 the conductive loop is arranged towards the side of the UHF antenna to reduce the electric currents over the conductive loop area in combination with the NFC antenna.

The safety feature of the cuts 8 distributed around the periphery of the label and the safety feature of the conductive loop 5d may be combined in the same label as shown in FIG. 3 or may be applied independently (as shown in FIG. 1 as far as the cuts are concerned).

FIGS. 4 and 5 show the theoretical read range (forward) of the two labels described above. In both Figures it can be observed that the theoretical read range of a label attached on a more or less flat glass surface has a maximum between the EU band (865-868 Mhz) and the US band (902-928 MHz). This maximum being higher than 4 m and ensures that in the respective frequency bands still a high theoretical read range of 4 m or more can be provided.

It is particularly difficult to form a good antenna with a high theoretical read range on the reduced space of a label of 40 mm to 20 mm and at the same time proved enough space for a second antenna which can be used for NFC.

Figure 7:
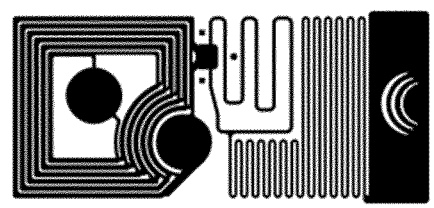
FIG. 7 shows the layout of a label of the state of the art.

The inventors discovered that with the antennas, as shown in FIG. 7, this object can be achieved, provided the following size restrictions are observed.

| | Dimensions | | |
|---|---|---|---|
| A | Inlay Width | 36.0 mm | +/− 0.2 mm |
| B | Inlay Length | 16.0 mm | +/− 0.2 mm |
| C | Label Width | 40.0 mm | +/− 0.5 mm |
| D | Label Length | 20.0 mm | +/− 0.5 mm |
| E | Label Pitch | 27.94 mm | +/− 1.0 mm |
| F | Inlay to Die Cut | 2.0 mm | +/− 1.6 mm |
| G | Die Cut to Web Edges | 2.5 mm | +/− 1.0 mm |
| H | Web Width | 45.0 mm | +/− 1.0 mm |

| Antenna Dimension | | |
|---|---|---|
| a | 8.9 mm | +/− 0.2 mm |
| b | 18.6 mm | +/− 0.2 mm |
| c | 2.35 mm | +/− 0.2 mm |
| d | 2.35 mm | +/− 0.2 mm |
| e | 3.3 mm | +/− 0.2 mm |
| f | 3.1 mm | +/− 0.2 mm |
| g | 0.5 mm | +/− 0.2 mm |
| h | 0.5 mm | +/− 0.2 mm |

For the label of FIG. 3 these dimensions are almost identical. However, when comparing FIGS. 1 and 3 it is evident that the first antenna for the UHF communication in FIG. 3 has a slightly different layout of the second antenna portion. In order to compensate for the influence of the tamper loop 5d the second antenna portion is provided with two half waves, whereas in the embodiment of FIG. 1 only one half wave is provided.

Furthermore the inventors discovered that the asymmetric configuration between the first and second portion of the UHF antenna is especially advantageous.

Although two examples of RFID labels have been shown, the invention is not limited to these examples.

For example, the rectangular shape of the half waves of one or both, the first and second portion of the antenna, can be designed in a more or less sine wave shape instead.

Furthermore, the inventors discovered that the theoretical read rang (forward) is influenced by the actual shape of the container, that is in case of a small container, due to the remarked bending of the label, the theoretical read rang can be smaller, but will still be above the conventional theoretical read range under similar conditions.

Especially, having the size of the label limited to 40 mm*20 mm makes the label particularly suitable for the use in connection with pharmaceutical equipment, like small cylindrical bottles, vials or syringes.

Figure 8:
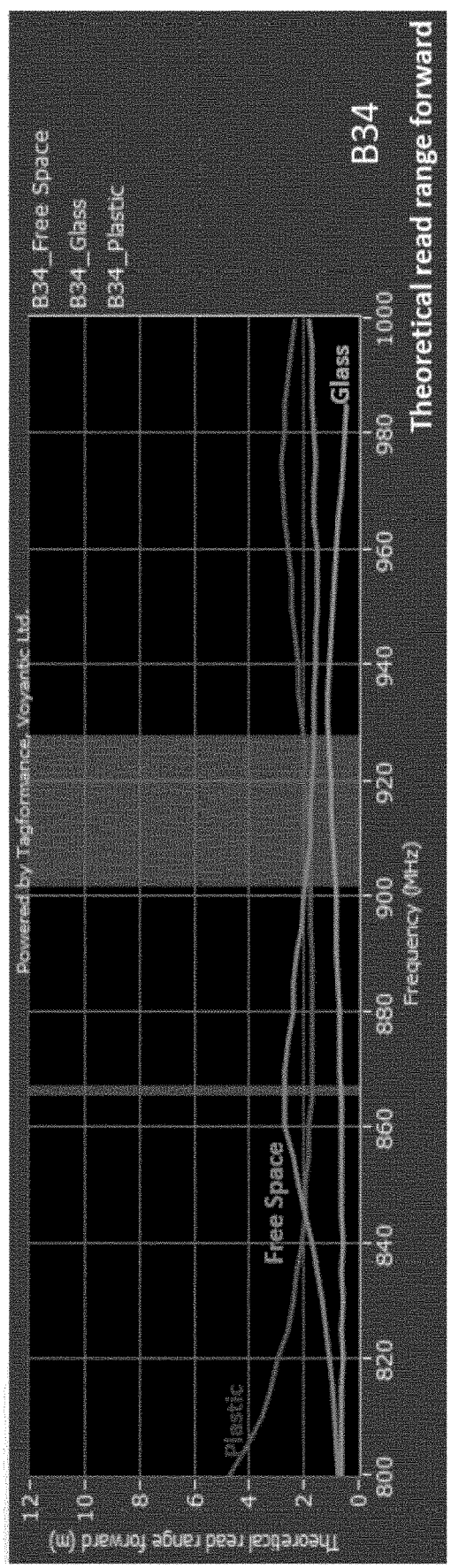
FIG. 8 shows the same diagram as FIG. 4 for the label of FIG. 6.

FIGS. 7 and 8 show the layout and the theoretical read range (forward) of a conventional label, which is not covered by the present invention. As can be see, the conventional antenna does not show a maximum of the theoretical read range between 860 MHz and 920 MHz for a glass support. This leads to the disadvantage that the read range is far smaller than with the present invention.

As explained above, and as can be seen in FIGS. 1 and 3, the UHF antenna comprises a first, second and third portion. The first portion is provided adjacent to one of the shorter sides of the RFID label and includes a "line" antenna arranged in a serpentine form with five rectangular half waves and a plate like end element.

The second portion is provided adjacent to the opposite shorter side of the label on the same surface and includes a "line" antenna arranged in a serpentine form with one (FIG. 1) or two (FIG. 3) rectangular half waves and a larger plate like end element.

Finally, the third portion is provided adjacent to a longer side of the label on the same surface and connecting the first and second portion. The third portion can be formed by an elongated plate like element with a cut away portion in the area of connection with the microelectronic. Preferably, the cut away portion is arranged asymmetrically with regard to the first and second portion of the antenna.

In the embodiments, the first and second portion of the antenna are spaced apart from each other so as to nest the second antenna, i.e. the NFC antenna formed by a plurality of loops, there between. The second antenna is configured for NFC communication in a range of 13 MHz, especially between 13.2 MHz and 13.6 MHz.

In the above embodiments the first and second portions of the antenna have a width of the "line" antenna part of 0.5 mm±0.2 mm.

Preferably, the first and second portions of the antenna have rectangular half waves with a width of the conductive line antenna part of 0.5 mm±0.2 mm and a clear space between the two sides of each rectangle of 0.5 mm±0.2 mm.

In the embodiments, the distance between the respective outer parts of the first and second portions in the direction of the longer side of the RFID label is 36.0 mm±0.2 mm, so that the antenna can be arranged on a label of 40 mm*20 mm having enough margin for the security cuts.

Preferably, the distance between respective inner parts of the first and second portions in the direction of the longer side of the RFID label is 24.8 mm±0.2. This allows to provide the second antenna for NFC communication with enough distance to the first antenna for UHF communication.

Preferably, each half wave of the first and second portion includes a first segment extending along the longer direction of the RFID label and having a length of 5.6 mm±0.2, a second segment extending along the shorter direction and having a length of 1.5 mm±0.2 and a third segment extending along the longer direction of the RFID label and having a length of 5.6 mm±0.2. With this construction the required total length of the antenna and the necessary area for the capacitive coupling to the dielectricum of the support can be realized.

The invention claimed is:

1. A label (1) for marking containers or equipment by adhering the label to a surface thereof, the label (1) comprising
    a support material base (11),
    at least one radio frequency identification (RFID) microelectronic device (5*c*) included in the support material base (11), and
    a plurality of antennas (5*a*,5*b*) for different frequency ranges connected with the at least one RFID microelectronic device (5*c*) and included in the support material base (11),
    wherein the plurality of antennas (5*a*, 5*b*) includes a first antenna (5*a*) for a frequency range of 860 to 960 MHz and having a theoretical read range peak of more than 4 m when provided on a glass surface, wherein the label has a dimension of 40 mm*20 mm or less,
    wherein the first antenna (5*a*) comprises a first portion, a second portion, and a third portion,
    the first portion being provided on a surface of said label adjacent to a first short side of the label and including a line arranged in a serpentine form with five rectangular or sine shaped half waves and an end element that is wider than said line of said first portion,
    the second portion being provided on said surface of said label adjacent to a second short side opposite to said first short side of the label and including a line arranged in a serpentine form with one or two rectangular or sine shaped half waves and an end element that is wider than said line of said second portion, and
    the third portion being provided on said surface of said label adjacent to a long side of the label and connecting the first portion and the second portion.

2. The label of claim 1, wherein the first and second portion of the first antenna (5*a*) are spaced apart from each other so as to nest a second antenna (5*b*) there between, the second antenna (5*b*) being configured for near-field NFC communication (NFC) in a range of 13 MHz.

3. The label of claim 1, wherein the line of each of the first and second portions of the first antenna (5*a*) have has a width of 0.5 mm+0.2 mm.

4. The label of claim 1, wherein the line of each of the first and second portions of the first antenna (5*a*) has rectangular half waves with the line having a width of 0.5 mm±0.2 mm and a clear space between the two sides of each rectangle of 0.5 mm±0.2 mm.

5. The label of claim 1, wherein a distance between respective outer parts of the first and second portions of the first antenna (5*a*) in a direction of the longer long side of the label is 36.0 mm±0.2 mm.

6. The label of claim 1, wherein a distance between respective inner parts of the first and second portions of the first antenna (5*a*) in a direction of the longer long side of the label is 24.8 mm±0.2.

7. The label of claim 1, wherein each half wave of the first and second portions of the first antenna (5*a*) includes
    a first segment extending along a long direction of the label and having a length of 5.6 mm±0.2,
    a second segment extending along a short direction of the label and having a length of 1.5 mm±0.2 and
    a third segment extending along the long direction of the label and having a length of 5.6 mm±0.2.

8. The label of claim 1, wherein the support material base (11) is flat and flexible.

9. The label of claim 1, wherein the support material base (11) comprises a polypropylene top surface layer (4) and a printed plastic or paper-based material or metal layer (2), and wherein the RFID microelectronic device (5*c*) is arranged on a surface of the printed plastic or paper-based material or a metal layer (2).

10. The label of claim 9, wherein the support material base (11) further comprises, on a bottom surface thereof, an adhesive bottom layer (6).

11. A container having a label (1) according to claim 1 adhered to a surface thereof.

12. An antenna for a radio frequency identification (RFID) label having a dimension of 40 mm*20 mm or less for marking containers or equipment by adhering the RFID label to a surface thereof, said antenna comprising:
    a first portion, a second portion, and a third portion, wherein the first portion is provided on a surface of said label adjacent to a first short side of the label and includes a line arranged in a serpentine form with five rectangular or sine shaped half waves and an end element that is wider than said line of said first portion, the second portion is provided on said surface of said label adjacent to a second short side opposite to said first short side of the label and includes a line arranged in a serpentine form with one or two rectangular or sine shaped half waves and an end element that is wider than said line of said second portion, and the third portion is provided on said surface of said label adjacent to a long side of the label and connects the first and second portion, and wherein said antenna has a theoretical read range peak of more than 4 m in a frequency range between 860 MHz to 960 MHz, when provided on a glass surface.

13. The antenna of claim 12, wherein the first portion and second portion are spaced apart from each other so as to allow to nest a further antenna (5b) for near-field communication (NFC) in a range of 13 MHz there between.

14. The antenna of claim 12, wherein the line of each of the first and second portions has a width of 0.5 mm±0.2 mm.

15. The antenna of claim 12, wherein the line of each of the first and second portions has rectangular half waves with the line having a width of 0.5 mm±0.2 mm and a clear space between the two sides of each rectangle of 0.5 mm±0.2 mm.

16. The antenna of claim 12, wherein a distance between respective outer parts of the first and second portions is 36.0 mm±0.2 mm.

17. The antenna of claim 12, wherein a distance between respective inner parts of the first and second portions is 24.8 mm±0.2.

18. The antenna of claim 12, wherein each half wave of the first and second portions includes
a first segment extending along am-a first direction and having a length of 5.6 mm±0.2,
a second segment extending perpendicular to the first direction and having a length of 1.5 mm±0.2 and
a third segment extending along the first direction and having a length of 5.6 mm±0.2.

* * * * *